(12) United States Patent
Kyrberg et al.

(10) Patent No.: US 7,355,351 B2
(45) Date of Patent: Apr. 8, 2008

(54) CIRCUIT ARRANGEMENT HAVING A CONVERTER WITHOUT A TRANSFORMER BUT WITH AN INDUCTOR FOR THE PULSED OPERATION OF DIELECTRIC BARRIER DISCHARGE LAMPS

(75) Inventors: Karl Kyrberg, München (DE); Arnulf Rupp, Oberhaching (DE); Oskar Schallmoser, Ottobrunn (DE)

(73) Assignee: Patent-Treuhand-Gesellschaft für elektrische Glühlampen mbH, München (DE)

( * ) Notice: Subject to any disclaimer, the term of this patent is extended or adjusted under 35 U.S.C. 154(b) by 0 days.

(21) Appl. No.: 11/485,231

(22) Filed: Jul. 12, 2006

(65) Prior Publication Data
US 2007/0018590 A1    Jan. 25, 2007

(30) Foreign Application Priority Data
Jul. 20, 2005    (DE) ...................... 10 2005 034 505

(51) Int. Cl.
*H05B 37/02* (2006.01)

(52) U.S. Cl. .................. 315/209 R; 315/224; 315/283; 315/291

(58) Field of Classification Search ........... 315/209 R, 315/224–226, 246, 258, 283, 291, 307–308; 323/206–207, 235, 271, 282, 290, 345, 351; 361/189, 268, 631, 837; 363/21.03, 22, 24, 363/82, 139, 152, 170
See application file for complete search history.

(56) References Cited

U.S. PATENT DOCUMENTS

| | | | | |
|---|---|---|---|---|
| 4,553,070 A * | 11/1985 | Sairanen et al. | ........ | 315/209 R |
| 4,996,462 A * | 2/1991 | Krummel | ................. | 315/209 R |
| 5,410,466 A * | 4/1995 | Maehara | ....................... | 363/98 |
| 5,604,410 A | 2/1997 | Vollkommer et al. | ....... | 315/246 |
| 5,959,410 A * | 9/1999 | Yamauchi et al. | ...... | 315/209 R |
| 5,994,849 A | 11/1999 | Vollkommer et al. | ....... | 315/246 |
| 6,018,221 A * | 1/2000 | Ohtake | ........................ | 315/307 |
| 6,097,155 A | 8/2000 | Vollkommer et al. | ......... | 315/58 |
| 6,294,882 B1 * | 9/2001 | Blom | .......................... | 315/246 |
| 6,437,515 B1 * | 8/2002 | Kamoi et al. | ........... | 315/209 R |
| 6,518,712 B2 * | 2/2003 | Weng | ...................... | 315/209 R |
| 6,734,641 B2 * | 5/2004 | Shoji et al. | .................. | 315/291 |

FOREIGN PATENT DOCUMENTS

EP    0 927 506 B1    7/1999

* cited by examiner

*Primary Examiner*—Haissa Philogene
*Assistant Examiner*—Tung X Le
(74) *Attorney, Agent, or Firm*—Frishauf, Holtz, Goodman & Chick, P.C.

(57) ABSTRACT

Circuit arrangement having a converter without a transformer but with an inductor for the pulsed operation of dielectric barrier discharge lamps The circuit arrangement according to the invention comprises an inductor-type converter for the pulsed operation of dielectric barrier discharge lamps (EL). The invention proposes both a half bridge variant and a full bridge variant. By selecting the inductance value of the inductor (L), it is possible to influence the edge steepness of the pulses, in the case of more than one inductor even independently for the rising and falling edges.

16 Claims, 8 Drawing Sheets

CIRCUIT ARRANGEMENT HAVING A CONVERTER WITHOUT A TRANSFORMER BUT WITH AN INDUCTOR FOR THE PULSED OPERATION OF DIELECTRIC BARRIER DISCHARGE LAMPS

TECHNICAL FIELD

The invention relates to a circuit arrangement having a converter without a transformer but with at least one inductor for the pulsed operation of a dielectric barrier discharge lamp. In addition, the invention is aimed at a lighting system having this converter circuit and a dielectric barrier discharge lamp as well as a corresponding operating method.

The term "dielectric barrier discharge lamp" is in this case to be understood as a general term, i.e. it is not merely restricted to lamps emitting in the range of the electromagnetic spectrum which is visible to the human eye. Instead, in this case radiators based on dielectric barrier discharge are also included which, in addition or even predominantly, emit outside this range, in particular also in the ultraviolet range and vacuum ultraviolet range.

From an electrical engineering point of view, dielectric barrier discharge lamps have a predominantly capacitive characteristic owing to the dielectric barrier. A parallel circuit comprising a first capacitance and a series circuit comprising a second capacitance and a nonreactive resistance is therefore usually assumed as a simple equivalent circuit diagram. While the dielectric barrier discharge lamp has not yet been started, the nonreactive resistance has a practically infinite value, i.e. initially only the first capacitance takes effect. However, as soon as the lamp is started, the nonreactive resistance assumes a finite value and therefore interacts with the second capacitance connected in series. Owing to the capacitive component, dielectric barrier discharge lamps can only be operated with a voltage which changes over time, for example a sinusoidal voltage, particularly preferably in a pulsed manner within the meaning of U.S. 5,604,410.

The inductor-type converter according to the invention is used for the purpose of operating dielectric barrier discharge lamps in a pulsed manner within the meaning of U.S. 5,604,410.

BACKGROUND ART

Dielectric barrier discharge lamps (also referred to as dielectrically impeded discharge lamps or occasionally silent discharge lamps) are known per se, for example from U.S. Pat. No. 5,994,849 or U.S. Pat. No. 6,097,155. They need to be operated by an electronic ballast which can apply high-voltage pulses iteratively to the discharge lamp. However, the invention is also directed at ballasts for other lamp types, which can be operated by iteratively generated voltage pulses and in the case of which there is a capacitive characteristic as in the case of dielectrically impeded discharges. In this regard, the term "dielectric barrier discharge lamp" can also be understood as being broadened to include such lamps and in particular also encompass all discharge lamps in which at least one electrode is arranged outside the discharge vessel.

The specification U.S. Pat. No. 6,323,600 B1 has disclosed a class E converter, also referred to as a flyback converter, for the pulsed operation of dielectric barrier discharge lamps. One disadvantage is the fact that the required core volume for the transformer or the input inductor increases with the lamp power. In addition, the range within which a connected lamp can be dimmed is relatively small.

DISCLOSURE OF THE INVENTION

The object of the present invention is to provide an alternative circuit arrangement for the pulsed operation of dielectric barrier discharge lamps.

This object is achieved by a circuit arrangement for the pulsed operation of a discharge lamp, in particular a dielectric barrier discharge lamp, having an inductor-type converter having
 a first switch branch and a second switch branch,
  each switch branch comprising a series circuit comprising a switch, a current valve and an inductance,
 a lamp branch, which has an inductance connected to the center point of the series circuit,
  the free terminal of this inductance being provided for connection to the first terminal of a discharge lamp,
 it being possible for up to two of the in total three inductances also to assume the value zero.

Particularly advantageous refinements are given in the dependent claims.

The basic concept of the invention consists in dispensing with the transformer of the previous converter concepts for the pulsed operation of dielectric barrier discharge lamps and, instead of this, feeding the dielectric barrier discharge lamp directly with at least one inductance. In this case, the lamp is connected to a supply voltage by means of active components for a period of time which can be set and is then isolated bidirectionally from this supply voltage. In addition, it makes it possible for the circuit arrangement according to the invention to apply a voltage, which may be higher than the supply voltage, to the dielectric barrier discharge lamp for a period of time which can be set.

The mentioned inductance is generally realized by an inductor according to the invention, for which reason, for reasons of simplicity, the term "inductor-type converter" mentioned at the outset will be used below. However, said inductance may under certain circumstances also be realized by the inductance of the lamp feed line if the line inductance is sufficiently high. However, at least one additional inductor is generally required.

The fact that the converter transformer has been dispensed with provides, inter alia, a cost advantage since inductors are more cost-effective than transformers. In addition to this there is the improved compactness of the circuit arrangement owing to the typically six to ten times smaller dimensions of the inductors used here compared to a transformer of a class E converter. By selecting the inductance it is possible to achieve steeper edges of the voltage pulses using the inductor-type converter according to the invention without having to compromise on the pulse width. Higher starting voltages compared to the class E converter can be achieved by resonant voltage escalation. Finally, it is not necessary for the energy fed into the lamp to be completely buffer-stored in the inductive components since the lamp current is drawn at times from the voltage supply. The inductive components in the circuit arrangement according to the invention can therefore have smaller dimensions. The optional use of more than one inductor provides the advantage of being able to adjust the rising and falling edges of the voltage pulse at the lamp independently of one another by the corresponding inductance values. This and further details are explained in more detail in the description of the figures.

In general, the circuit arrangement according to the invention can be split roughly into two classes. For pulse generation, the first variant uses in principle two switch branches, which are connected in series, are fed from an electrical supply source, are operated or driven alternately in the manner of a half bridge and are therefore referred to as a half-bridge inductor-type converter below for reasons of simplicity. Each switch branch contains one or more switches which are connected in series, for example controllable semiconductor switches such as transistors, in particular FETs (field effect transistors), IGBTs (insulated gate bipolar transistors) or the like. Owing to the fact that a plurality of switches are connected in series, it is possible to alleviate the disadvantage associated, in principle, with this variant of the high reverse withstand voltage required. Otherwise, switches with a high blocking capability are required which typically withstand approximately 2 kV reverse voltage. With the aid of the first switch branch, the discharge lamp is connected for a short period of time to the electrical supply via an inductor (state of the first switch branch: "closed"). In this case, a current pulse flows through the inductor and the lamp (as long as the lamp has not yet been started, as a pure displacement current). Then, the lamp is again isolated from the electrical supply at the current zero crossing (state of the first switch branch: "open"). Subsequently, optionally after an interval time which can be set, a circuit which is isolated from the electrical supply source and comprises the lamp and the inductor is closed with the aid of the second switch branch, and a current pulse having a reverse polarity flows through the inductor and the lamp. Then, this circuit is again interrupted at the current zero crossing (state of the second switch branch: "open", in the case of real switches, for example MOSFETs with an integrated freewheeling diode, "reverse blocking" by means of a current valve, for example a diode, connected in series). Subsequently, optionally after an interval time which can be set, the lamp is again connected to the electrical supply via the inductor etc.

For pulse generation, the second variant uses in principle two times two switch branches connected in series, a diagonal switch branch pair always being driven alternately with the other diagonal switch branch pair in the manner of a full bridge and therefore being referred to below, for reasons of simplicity, as a full-bridge inductor-type converter. In this case, the lamp is therefore connected to the electrical supply source alternately by means of a diagonal switch branch pair and via at least one inductor with alternating polarity. The current pulses of alternating polarity generated in this manner can optionally be separated from one another by an interval time which can be set, as in the case of the half bridge variant. In the full bridge variant, the voltage load on the individual switch is correspondingly lower, but in general two switches more need to be used than in the half bridge variant. One further advantage of the full-bridge inductor-type converter in comparison with the half-bridge inductor-type converter is the fact that there is less interference radiation from the dielectric barrier discharge lamp since only lower interference currents flow when there is an appropriate design of the components.

If the switches in the switch branches are implemented by transistors with an integrated freewheeling diode, for example MOSFETs, in each case one current valve, which allows the current to flow only in one direction, for example a diode, is connected in series in each switch branch. In this manner, a blocking effect is ensured in both flow directions in the "open" switch state in this case, too.

BRIEF DESCRIPTION OF THE DRAWINGS

The invention will be explained in more detail below with reference to exemplary embodiments. In the figures.

BEST MODE FOR CARRYING OUT THE INVENTION

Figure 1:
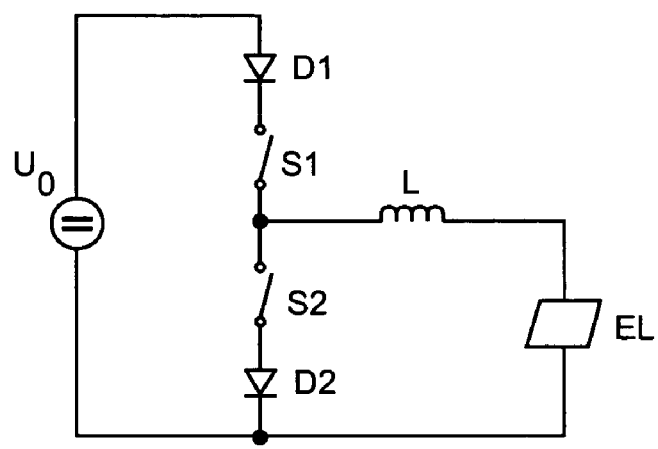
FIG. 1 shows a basic circuit of a first variant of the half-bridge inductor-type converter according to the invention.

FIG. 1 shows the basic circuit diagram of a first variant of the half-bridge inductor-type converter according to the invention. Said half-bridge inductor-type converter has two switch branches connected in series which each comprise a current valve D1, D2, for example a diode, and a switch S1, S2, for example a transistor, in particular a field effect transistor (FET) or MOSFET. The center point of the series circuit comprising the two switch branches is connected to a lamp branch, which comprises an inductor L and a dielectric barrier discharge lamp EL connected in series with said inductor L. The lamp branch is connected in parallel with one of the two switch branches. For lamp operation, the terminals of the series circuit comprising the two switch branches are connected to an electrical supply source $U_0$.

Figure 2A:
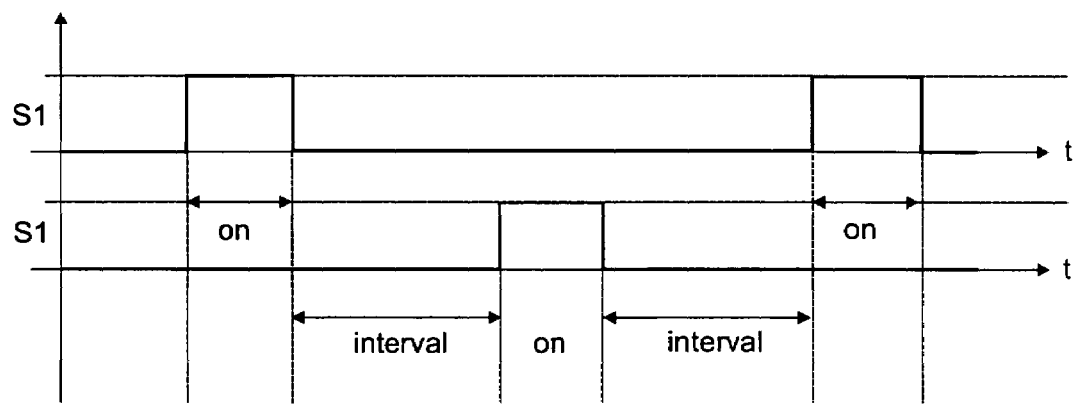
FIGS. 2a-e show a switching scheme for the circuit shown in FIG. 1 both for the phase before starting and for the steady-state operation of a dielectric barrier discharge lamp.
Figure 2B:
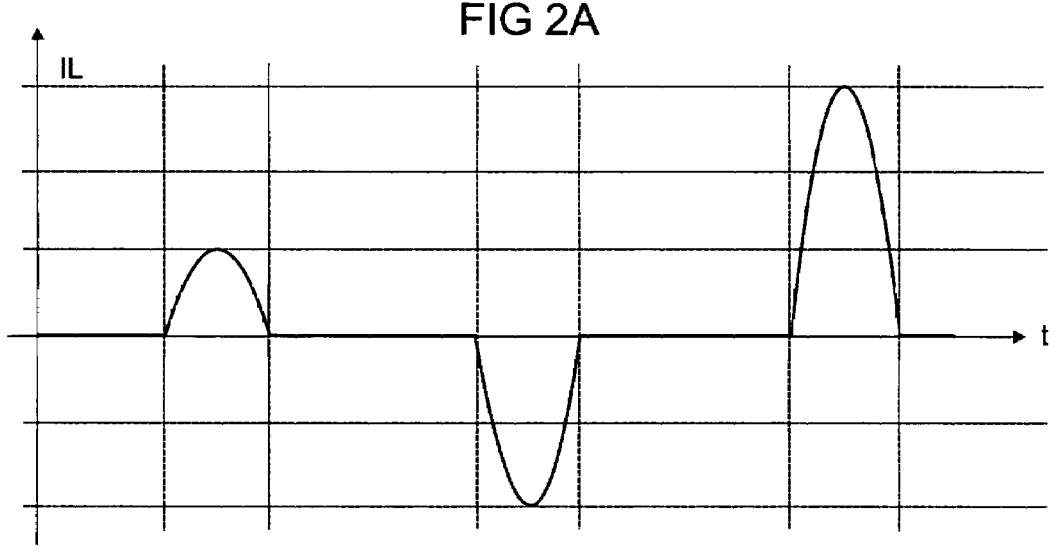
Figure 2C:
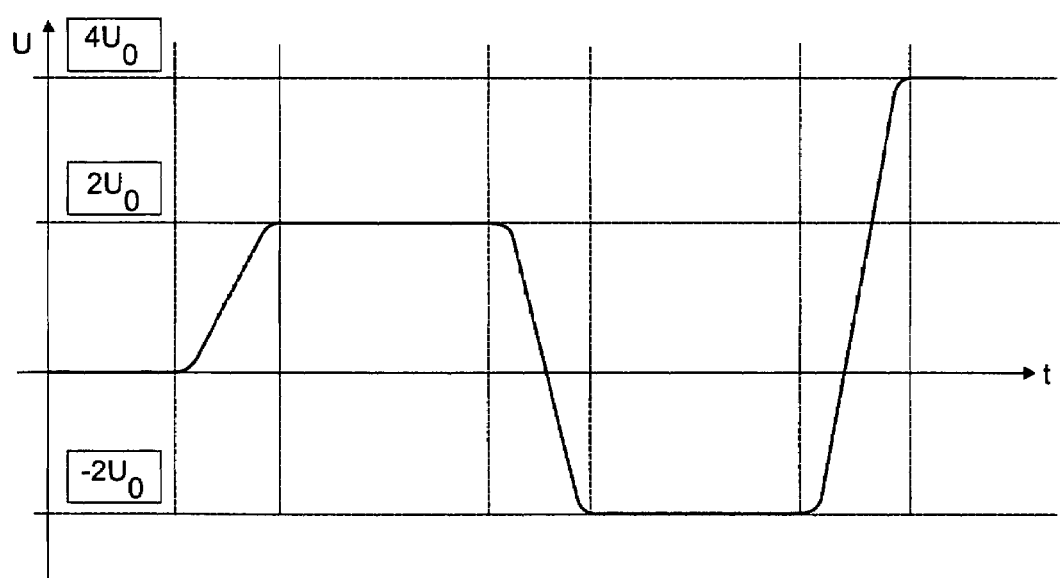
Figure 2D:
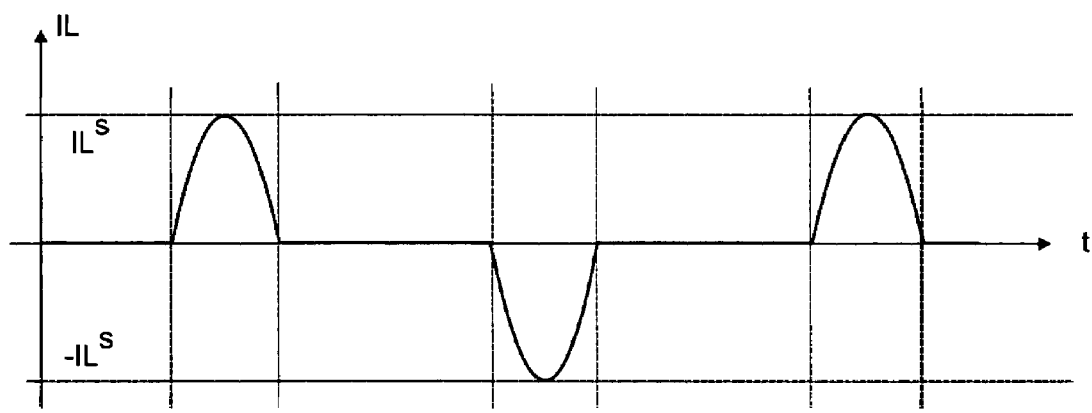
Figure 2E:
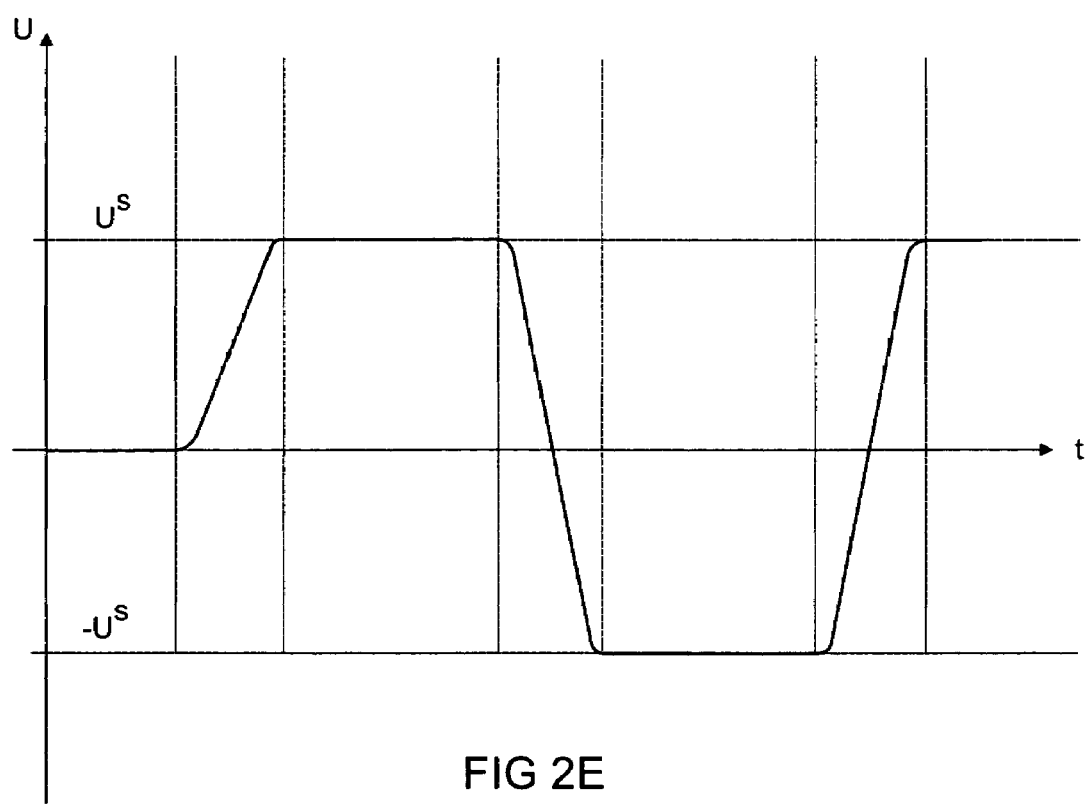

In order to describe the manner in which the basic circuit shown in FIG. 1 functions, reference will also be made below to the signal profiles illustrated in FIGS. 2a-2e. FIG. 2a shows the drive signals of the two switches S1 and S2. As shown in FIG. 2b, a pulse-shaped current $I_L$ can only flow through the inductor L during the "on times", i.e. when precisely one of the two switches S1, S2 is closed. During the "interval times", i.e. when neither of the two switches S1, S2 is closed, on the other hand, no current flows through the inductor L. Correspondingly, the voltage U at the lamp terminals increases when the circuit is first switched on, i.e. when the dielectric barrier discharge lamp EL has not yet been started and acts almost as an electrical capacitor. While the first switch S1 is closed, the voltage U in the ideal case rises up to twice the value of the supply voltage $U_0$. Then, the voltage U initially remains constant during the interval time until the second switch S2 closes and, as a consequence, a pulse-like current $I_L$ again flows through the inductor L, but now with the opposite polarity to that of the previous current pulse. As a consequence, the polarity of the lamp voltage U also changes to the negative of twice the value of the supply voltage $U_0$. This voltage remains constant again during the subsequent interval time until the first switch S1 closes again and, as a consequence, the polarity once again changes. These processes are repeated such that an increasingly rectangular voltage results or a current pulse train results with alternating polarity. In this case, the amplitude of the current pulses $I_L$ increases with every pulse, and that of the voltage increases with every period. This resonant response is maintained until the dielectric barrier discharge lamp EL is started. In order to shorten this phase prior to starting, it may be advantageous to optionally set the interval time to zero, i.e. to close and open the two switches S1, S2 directly alternately. In this manner, a resonant current or voltage oscillation results. Owing to the fact that there is no interval time prior to starting the lamp, the voltage load for the switches S1, S2 and the diodes D1, D2 is also limited to the supply voltage. As long as the dielectric barrier discharge lamp EL has not yet been started, the current pulse $I_L$ flows as a pure displacement current through the dielectric barrier discharge lamp EL, which, unstarted, acts as a pure capacitor. As soon as the dielectric barrier discharge lamp EL has been started, provision is in any case made according to the invention for the interval time to be greater than zero in order, as a result, to realize the efficient operation of these lamps mentioned initially. This steady-state operating state is illustrated in FIG. 2d for the current $I_L$ through the inductor L and in FIG. 2e for the lamp voltage U. In the steady-state operating state, the started dielectric barrier discharge lamp EL "damps" the oscillation resonance to a steady-state current value $I_L^S$ or voltage value $U^S$. In addition, the switches S1, S2 are generally operated in the currentless state, with the result that the switching losses are minimal.

For this purpose, the switch-on time is longer than the current pulse.

Figure 3:
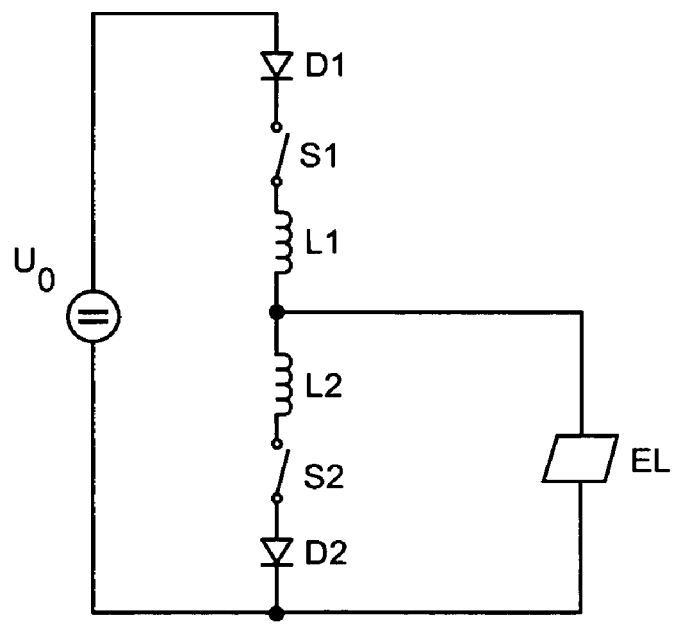
FIG. 3 shows a basic circuit of a second variant of the half-bridge inductor-type converter according to the invention.

FIG. 3 illustrates a subvariant of the half-bridge inductor-type converter described in FIG. 1. Its operation differs from the operation described previously in connection with FIGS. 2a-2e merely by the fact that two different inductances L1, L2 are now decisive for the alternating current pulses and consequently for the rising and falling edges of the lamp voltage U. For this purpose, the inductor L in FIG. 2 is split into the two inductors L1 and L2 and, in addition, is integrated in the two switch branches of the half-bridge inductor-type converter, i.e. in each case in series with the switch and the diode. The second inductor finally provides a further degree of freedom for influencing the voltage edges. In terms of circuitry, the circuit in FIG. 1 corresponds technically to the case in which the two inductance values $L_1$, $L_2$ of the two inductors L1, L2 are equal, i.e. $L_1=L_2$. This subvariant has increased operating reliability compared to the variant illustrated in FIG. 1.

Finally, a third variant (not illustrated) having three inductors can be created as a combination of the variants illustrated in FIGS. 1 and 3.

Figure 4:
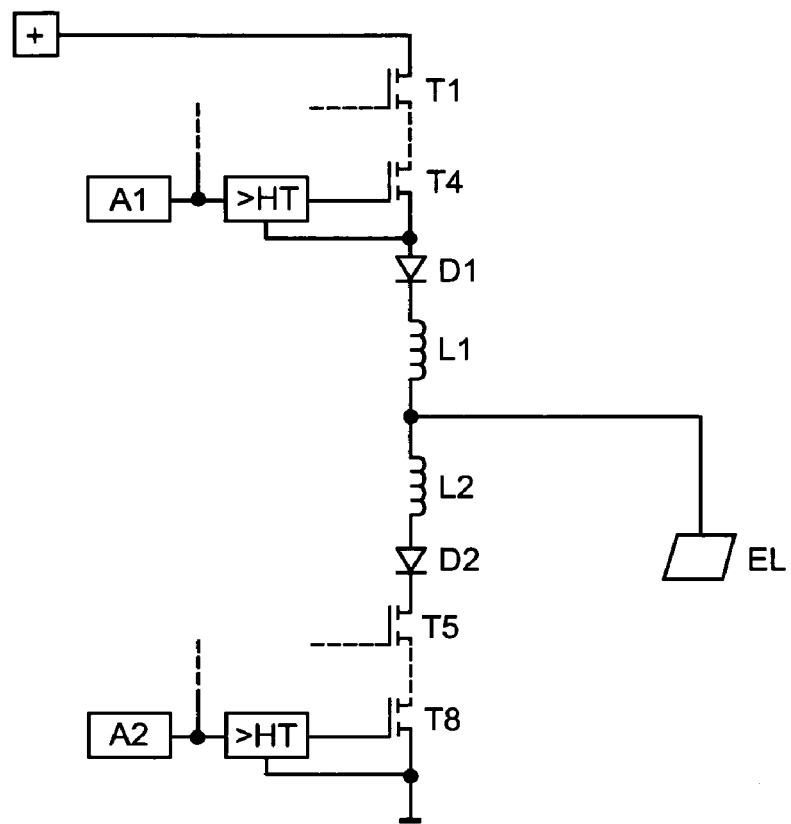
FIG. 4 shows a specific exemplary circuit for the second variant of the half-bridge inductor-type converter according to the invention.
Figure 5:
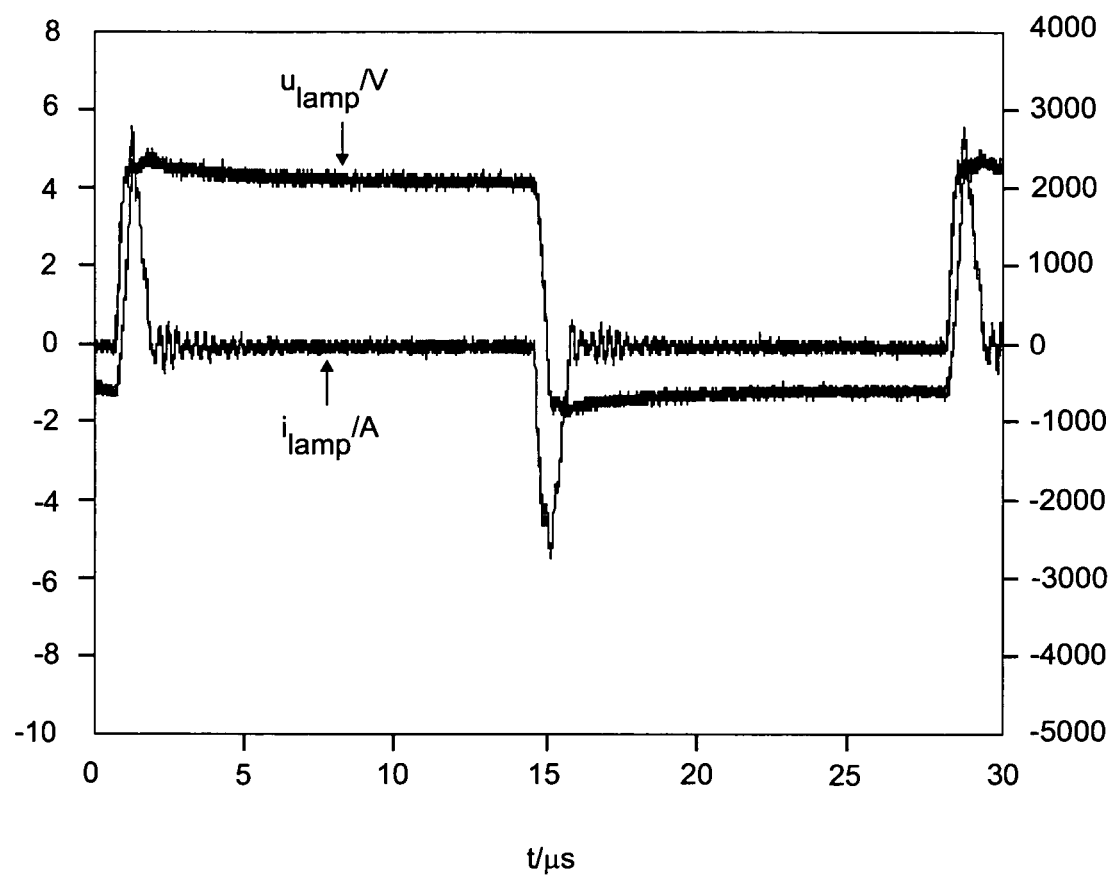
FIG. 5 shows the time profile of the current and the voltage for specific dimensions of the exemplary circuit shown in FIG. 4.

FIG. 4 shows a specific exemplary embodiment of the basic circuit illustrated in FIG. 3 of the second variant of the half-bridge inductor-type converter according to the invention having two inductors L1 and L2. This circuit is envisaged for operation of a flat dielectric barrier discharge lamp of the type PLANON® (OSRAM GmbH; see, for example, the web link on the Internet: http://www.osram.de/ueber_uns/umwelt/produkte/planon.html#) with a diagonal of 32". At a system power of approximately 213 W, luminances of 6310 cd/m² or more can be achieved, at a luminous efficiency of, for example, 8.3 cd/W or more. The luminous efficiency achieved using the inductor-type converter according to the invention is therefore approximately 30% higher than with a conventional class E converter circuit. Each of the two switch circuits comprises, as the switches, four MOSFETs (metal oxide semiconductor field effect transistors) T1 to T4 and T5 to T8 of the type 17N80 COOLMOS (Infineon) in order not to have to load the individual transistors with the high input voltage of approximately 1400 V. In addition, these transistor types have low on-state losses and switching losses. In this case, in future a single transistor per switch branch could also possibly be sufficient, as soon as correspondingly high-blocking switching transistors, for example using SiC (silicon carbide) technology, are available. Owing to the reverse recovery effect (diodes also conduct the current for a certain period of time in the reverse direction), the two diodes D1, D2 are likewise designed used SiC technology for a voltage of 1200 V and a current of 5 A. The two inductors L1, L2 in this case have the same inductance of in each case 104 µH. The four transistors T1 to T4 and T5 to T8 in each switch branch are driven by in each case one driving square-wave generator A1, A2 via in each case one high-side driver HT (known per se) per transistor. FIG. 5 illustrates the associated time profile graph for the lamp current $i_{EL}$ in amperes (A) and the lamp voltage $u_{EL}$ in volts (V); the unit of the y axis is microseconds (µs). Accordingly, the current pulses have a duration of approximately 1 µs and a repetition rate of 36.36 kHz. The duty factor is 50%. The efficiency of the circuit is in this case more than 85%. During overload operation of the circuit shown in FIG. 4 at 752 W, a luminance of more than 20,000 cd/m² is achieved. For this purpose, two identical inductors having inductance values of in each case 14 µH were used, and a capacitor with a capacitance of 471 pF was connected in parallel with the lamp. The current pulses had a duration of 0.6 µs at a pulse repetition rate of 67.8 kHz.

Figure 6:
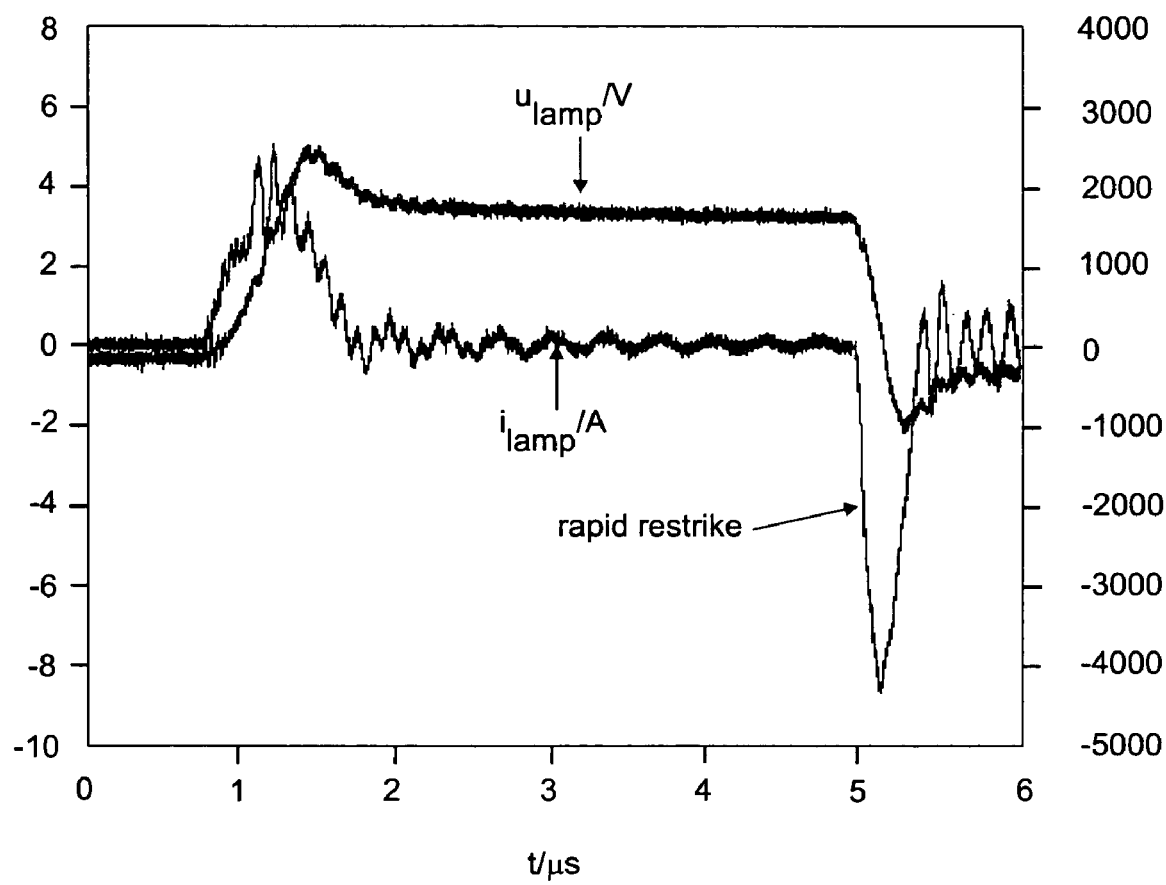
FIG. 6 shows the time profile of the current and the voltage for a differently dimensioned exemplary circuit corresponding to FIG. 4.

FIG. 6 shows the corresponding time profile graph for unequal induction values of the two inductors L1 and L2, namely 104 µH and 14 µH, respectively.

Figure 7:
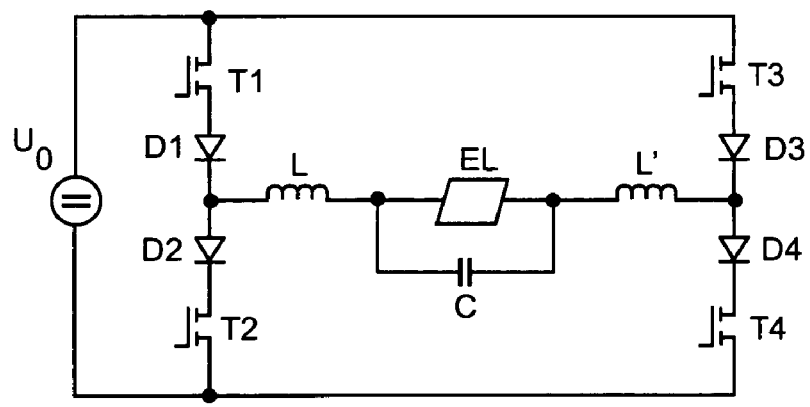
FIG. 7 shows a first variant of the full-bridge inductor-type converter according to the invention.

FIG. 7 illustrates a first basic circuit of a full-bridge inductor-type converter according to the invention having a symmetrical topology. The resulting symmetrical lamp voltage, given a symmetrical design of the dielectric barrier discharge lamp, i.e. given the same area for the two dielectrically impeded electrodes, is advantageous from an EMC (electromagnetic compatibility) point of view, since in this case the electromagnetic far field is zero. In this case, the dielectric barrier discharge lamp EL is connected to in each case two switch branches in the manner of a full bridge, between the center points of in each case two series circuits and via two inductors L, L'. Each of the four switch branches comprises a series circuit comprising a transistor T1 to T4 and a diode D1 to D4. In addition, a capacitor C is connected in parallel with the lamp EL.

Figure 8A:
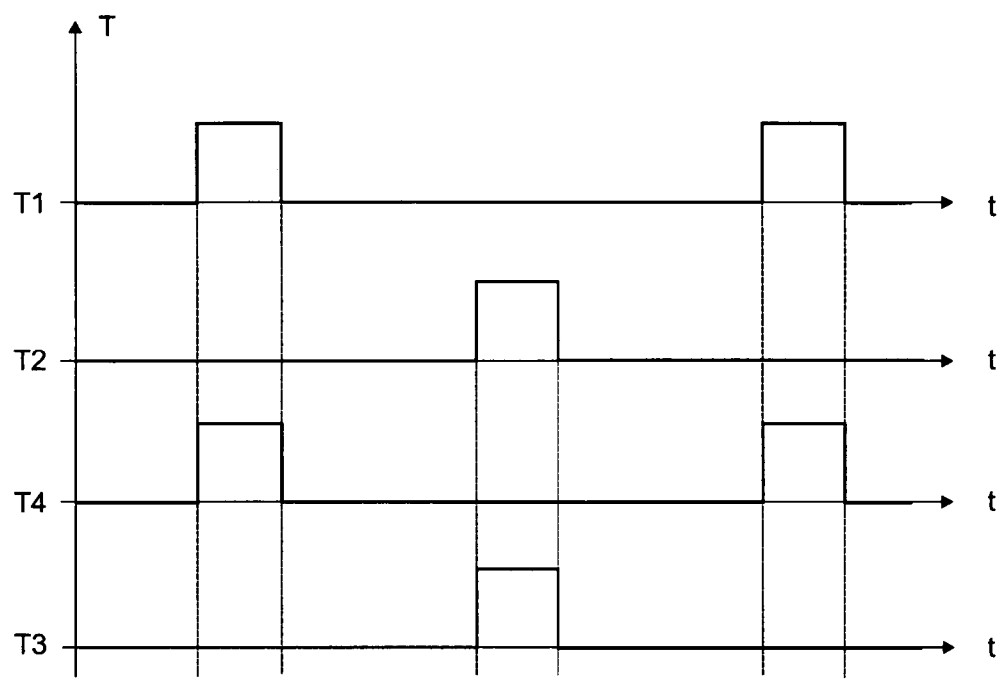
FIG. 8 shows the switching scheme for the steady-state operation of the full-bridge inductor-type converter shown in FIG. 7.
Figure 8B:
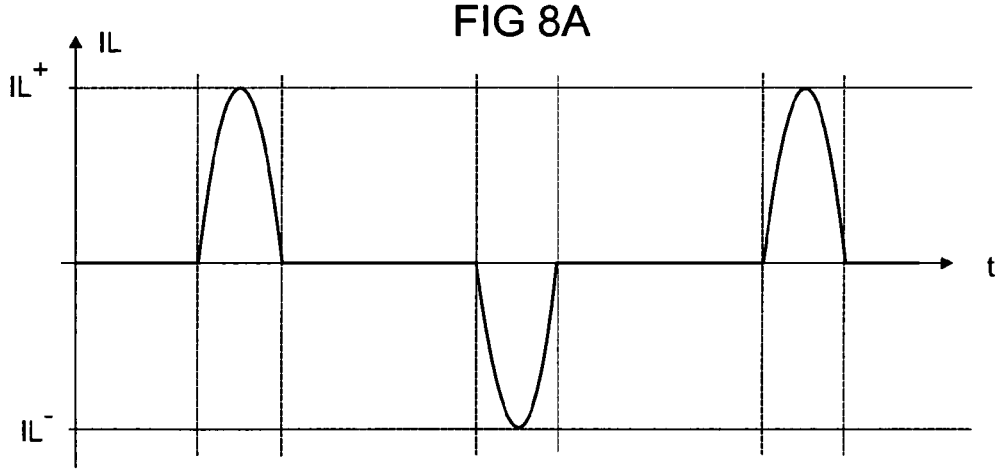
Figure 8C:
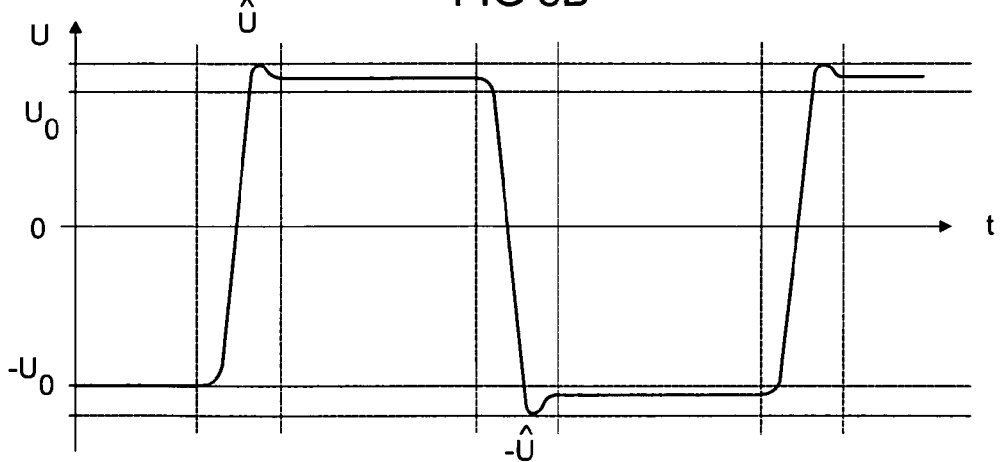

FIGS. 8a-8c show the switching scheme of the circuit shown in FIG. 7. As can be seen from FIG. 8a, the diagonally arranged switching transistor pairs T1, T4 and T2, T3 close alternately after an interval, in synchronous fashion. As a result, the positive and negative current pulses $I_L$ are produced, whose amplitudes $I_{L+}$ and $I_{L-}$, respectively, are equal in this case. As a consequence, a square-wave voltage signal U which is symmetrical with respect to the zero line results at the terminals of the dielectric barrier discharge lamp EL. The voltage increase $\Delta U=U_{max}-U_0$ with respect to the intermediate circuit voltage $U_0$ can be influenced by the selection of the inductances of the inductors L1, L2 and of the capacitor C. Since the diodes D1 to D4 are off before the transistors T1, T4 and T2, T3 open, switch-off losses are avoided in the transistors T1-T4.

Figure 9:
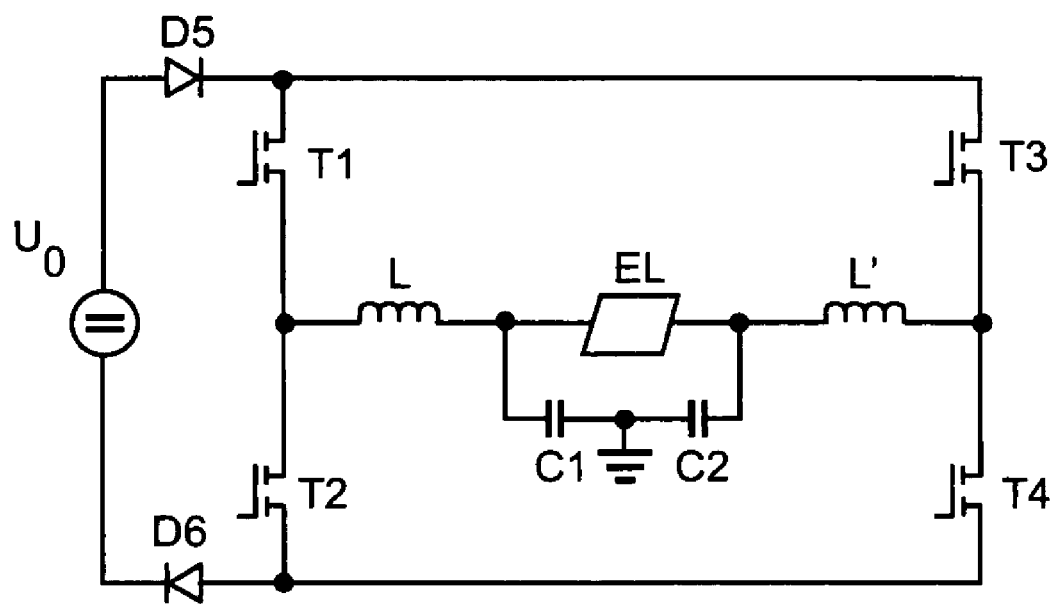
FIG. 9 shows a second variant of the full-bridge inductor-type converter according to the invention.

FIG. 9 shows a subvariant of the full-bridge inductor-type converter illustrated in FIG. 7. In this case, the diodes D1 to D4 illustrated in FIG. 7 are withdrawn from the switch branches and are connected, in each case as a common diode D5 or D6, into the common feed lines for the full-bridge switch branches. In addition, the capacitor C is replaced by a series circuit comprising two capacitors C1 and C2, whose center point is connected to a constant potential, for example ground, for the purpose of balancing the lamp voltage. In this case, too, as already described with reference to FIG. 7, the resulting symmetrical lamp voltage given a symmetrical design of the dielectric barrier discharge lamp is advantageous from an EMC point of view.

Figure 10:
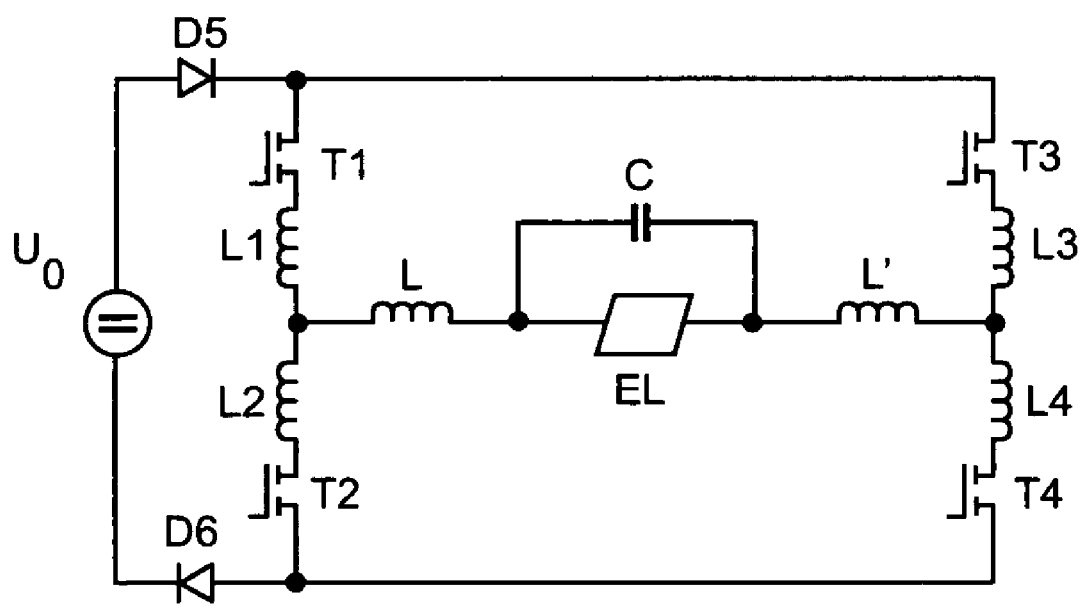
FIG. 10 shows a third variant of the full-bridge inductor-type converter according to the invention.

FIG. 10 shows a further subvariant of the full-bridge inductor-type converter according to the invention. It differs from the variant illustrated in FIG. 9 merely by the fact that in each case one inductor L1-L4 is also additionally connected in each switch branch. This makes it possible for the level of the positive and negative current pulses and, as a consequence, the edges of the square-wave voltage to be selected differently for the lamp by the inductances of the inductors L1 and L4 being selected to be different than those of the inductors L2 and L3.

What is claimed is:

1. A circuit arrangement for the pulsed operation of a discharge lamp, in particular a dielectric barrier discharge lamp, having an inductor-type converter having a first switch branch and a second switch branch, each switch branch comprising a series circuit comprising a switch, a current valve and an inductance, a lamp branch, which has an inductance connected to a center point of the series circuit, a free terminal of the inductance of the lamp branch being provided for connection to a first terminal of the discharge lamp, wherein at least one of the inductances does not assume the value zero; and wherein there is no diode connected in parallel to any switch branch.

2. The circuit arrangement as claimed in claim 1, a constant potential of a circuit arrangement being provided for connection to the second terminal of the discharge lamp.

3. The circuit arrangement as claimed in claim 1, having an additional series circuit comprising a third switch branch and a fourth switch branch, the additional series circuit being connected in parallel with the series circuit comprising the two first switch branches, the third switch branch and the fourth switch branch each comprising a series circuit comprising a switch, a current valve and an inductance, an inductance, which is connected to the center point of the additional series circuit, the free terminal of this inductance being provided for connection to the second terminal of the discharge lamp.

4. The circuit arrangement as claimed in claim 3, which is of symmetrical design with respect to the terminals provided for connection to a discharge lamp.

5. The circuit arrangement as claimed in claim 3 or 4, in which the four current valves are withdrawn from the switch branches and are replaced by two current valves, one in each of the two feed lines to the parallel circuit comprising the two series circuits with the in total four switch branches.

6. The circuit arrangement as claimed claim 3 having a capacitor, which is connected to the terminals provided for connection to a discharge lamp.

7. The circuit arrangement as claimed in claim 6, the capacitor being replaced by a series circuit comprising two capacitors, and the center point of this series circuit being connected to a constant potential of the circuit arrangement, for example to the circuit ground.

8. A method for operating a circuit arrangement as claimed in claim 3, alternately the switches of the respective switch branches connected to one another diagonally being operated synchronously.

9. The circuit arrangement as claimed in claim 1, the current valves being in the form of diodes.

10. The circuit arrangement as claimed in claim 1, the switches being in the form of transistors.

11. The circuit arrangement as claimed in claim 1, the inductances in the switch branches being in the form of inductors.

12. The circuit arrangement as claimed in claim 1, the inductance(s) in the lamp branch being in the form of an inductor/inductors or in the form of a feed line with a suitable feed line inductance.

13. The circuit arrangement as claimed in claim 1, two or more switches being connected in series into the switch branches and being envisaged for synchronous actuation.

14. A lighting system having a circuit arrangement as claimed in claim 1 or claim 3 and a dielectric barrier discharge lamp, whose two terminals are connected to the terminals of the circuit arrangement provided for this purpose.

15. A method for operating a discharge lamp having a circuit arrangement as claimed in claim 1 or 2, the switches of the two switch branches being operated alternately, in each case optionally with an interval in-between.

16. The method as claimed in claim 15, the switches being opened in currentless fashion.

* * * * *